US011528299B2

(12) United States Patent
Hughes et al.

(10) Patent No.: US 11,528,299 B2
(45) Date of Patent: Dec. 13, 2022

(54) METHOD DEVICE AND SYSTEM FOR POLICY BASED PACKET PROCESSING

(71) Applicant: HEWLETT PACKARD ENTERPRISE DEVELOPMENT LP, Houston, TX (US)

(72) Inventors: David Anthony Hughes, Los Altos Hills, CA (US); Manoj Kumar Dutta, Dublin, CA (US); Manoj Gopal Kulkarni, Fremont, CA (US); Pawan Kumar Singh, Los Altos, CA (US); Damon John Ennis, San Jose, CA (US); Theodore Ernest Tedijanto, Cupertino, CA (US); Patrick Lee Mahan, Soquel, CA (US); Bowen Yan, San Jose, CA (US); Zhigang Yin, Mountain View, CA (US); Kennedy Tjong Ki Ngo, Milpitas, CA (US); Ganesh Lakshmanan, Dublin, CA (US); Ravikumar Govindarao, Bangalore (IN); Srivathsa Sarangapani, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 236 days.

(21) Appl. No.: 16/868,452

(22) Filed: May 6, 2020

(65) Prior Publication Data

US 2021/0352109 A1 Nov. 11, 2021

(51) Int. Cl.
*H04L 9/20* (2006.01)
*H04L 9/40* (2022.01)
*H04L 61/256* (2022.01)

(52) U.S. Cl.
CPC ............ *H04L 63/20* (2013.01); *H04L 61/256* (2013.01); *H04L 63/0209* (2013.01); *H04L 63/0236* (2013.01); *H04L 63/0245* (2013.01)

(58) Field of Classification Search
CPC . H04L 63/20; H04L 63/0209; H04L 63/0236; H04L 63/0245
See application file for complete search history.

(56) References Cited

U.S. PATENT DOCUMENTS

| 2004/0034800 A1* | 2/2004 | Singhal ............... H04L 63/1408 709/224 |
| 2005/0132030 A1* | 6/2005 | Hopen ................ H04L 67/1038 709/223 |

(Continued)

FOREIGN PATENT DOCUMENTS

WO 2015/132624 A1 9/2015

OTHER PUBLICATIONS

Extended European Search Report Received for EP Application No. 21154201.4, dated Jul. 20, 2021, 9 pages.

*Primary Examiner* — William S Powers

(57) ABSTRACT

Provided are methods, apparatus, and system for policy based wide area network. A network of network appliances is configured with a policy configuration. Each network appliance is configured to validate each wide area network packet against the policy configuration. The validation can include verifying that the packets meet the SD-WAN network segment requirements and security rules including verifying that the source and destination address of the packet meet the firewall zone requirements. Each wide area network packet contains a policy header that is checked by the sending and receiving network appliance against the policy configuration.

16 Claims, 9 Drawing Sheets

(56) References Cited

U.S. PATENT DOCUMENTS

| | | | |
|---|---|---|---|
| 2010/0020753 A1* | 1/2010 | Fulknier | H04L 45/24 370/329 |
| 2013/0329731 A1* | 12/2013 | Gabriel | H04L 45/741 370/392 |
| 2015/0381503 A1 | 12/2015 | Visser et al. | |
| 2016/0099864 A1* | 4/2016 | Akiya | H04L 47/24 370/216 |
| 2016/0218947 A1 | 7/2016 | Hughes et al. | |
| 2020/0092211 A1* | 3/2020 | Vytla | H04L 47/20 |

\* cited by examiner

METHOD DEVICE AND SYSTEM FOR POLICY BASED PACKET PROCESSING

TECHNICAL FIELD

This application relates generally to computer networking and more specifically to a system and method for network packet generation and processing packets utilizing network policy information.

BACKGROUND

In prior network architectures, branch office networks would connect to data centers using WAN (Wide Area Network) connections via a router. The leased WAN line could use Multi-Protocol Label Switching (MPLS) as the connection protocol and this was a workable architecture because all the applications resided at the data centers. Access control to the data center and application were distributed across each back office's router with each having to be individually configured. Further, other security measures would have to be individually configured.

Now, networking architecture includes SaaS (software as a service) applications. These applications have moved from the corporate data centers to the Internet cloud. Exemplar of such cloud applications are Google Cloud, Amazon AWS, Dropbox, Salesforce. Routing to these applications back through a central data center has a disadvantage in that it adds additional delay and can clog the leased line bandwidth back to the data center. To be able to utilize Internet access, for routing data to these SaaS applications, the architecture needs to utilize direct access to the Internet.

This has driven the need for software defined networks (SD-WAN) for segmenting traffic between the WANs and direct Internet access. Further, managing access control for hundreds or thousands of segments, tunnels between segments, and security for these segments can be complex and prone to human error. What is needed is a networking architecture where the wide area network packets include network segment, application, and security information.

SUMMARY

This summary is provided to introduce a selection of concepts in a simplified form that are further described in the Detailed Description section below. This summary is not intended to identify key features or essential features of the claimed subject matter, nor is it intended to be used as an aid in determining the scope of the claimed subject matter.

Generally, the present disclosure is directed to a method, device, and system for the generation and processing of wide area networking packets that contain policy information. The policy information can include but is not limited to network segment information and security information. In one aspect of the invention, a packet is received and is ready to send on the WAN. Based on the source and the destination of the packet, it is associated with a policy configuration. If the packet has a valid policy configuration, a policy header is added to the packet that can incorporate security information. Further, the packet can include networking segment information, application information, tunneling and address translation information. Received or incoming packets are associated with the policy configuration, and validated against the policy configuration. If a packet conforms to the policy configuration, then the payload is forwarded to the interface indicated by their destination address. Further, the packet payloads can be encrypted and network address translation performed on the packet's payload.

BRIEF DESCRIPTION OF DRAWINGS

Exemplary embodiments are illustrated by way of example and not limitation in the figures of the accompanying drawings, in which like references indicate similar elements.

FIG. 6A is an exemplar user interface for configuring routing overlays, firewall zones, and address translation.

FIG. 6B is an exemplar user interface for configuring networking segments.

FIG. 6C is an exemplar user interface for configuring firewall zones segments.

DETAILED DESCRIPTION OF EXEMPLARY EMBODIMENTS

The following detailed description includes references to the accompanying drawings, which form a part of the detailed description. The drawings show illustrations, in accordance with exemplary embodiments. These exemplary embodiments, which are also referred to herein as "examples" are described in enough detail to enable those skilled in the art to practice the present subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents. In this document, the terms "a" and "an" are used, as is common in patent documents, to include one or more than one. In this document, the term "or" is used to refer to a nonexclusive "or," such that "A or B" includes "A but not B," "B but not A," and "A and B," unless otherwise indicated.

The embodiments disclosed herein may be implemented using a variety of technologies. For example, the methods described herein may be implemented in software executing on a computer system containing one or more computers, or in hardware utilizing either a combination of microprocessors or other specially designed application-specific integrated circuits (ASICs), programmable logic devices, or various combinations thereof. In particular, the methods described herein may be implemented by a series of computer-executable instructions residing on a storage medium, Such as a disk drive, or computer-readable medium.

Figure 1:
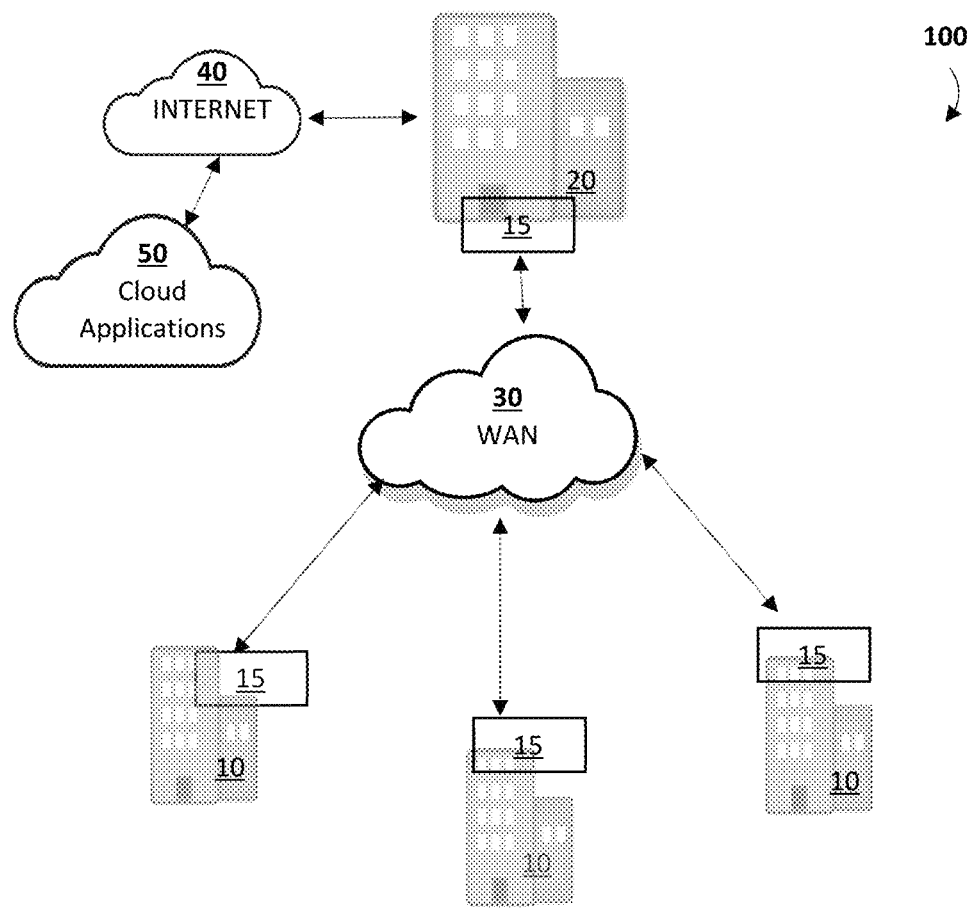
FIG. 1 illustrates a prior art wide area network architecture with SaaS application traffic backhauled through a common server.

The embodiments described herein relate wide area networking using packet generating and processing based on a policy configuration networking. FIG. 1 illustrates a prior art illustration of a networking architecture 100. In this architecture, several branch offices 10 are connected to a central office 20 that can include a data center. All data from the branch offices 10 is transported via routers 15, over the WAN 30 and other networking equipment back to the central office for processing. The WAN 30 can be leased communication links or other service provider networks.

Where applications at a branch office 10 utilized SaaS (software as a service) 50 (MS Office, cloud storage, . . . ), they are accessed through the Internet 40 via the routers 15 back to the central office. However, routing all the data through the WAN network 30 can slow SaaS application 50 performance. Further, such architectures lack centralized security and uniform management systems for configuration.

Figure 2:
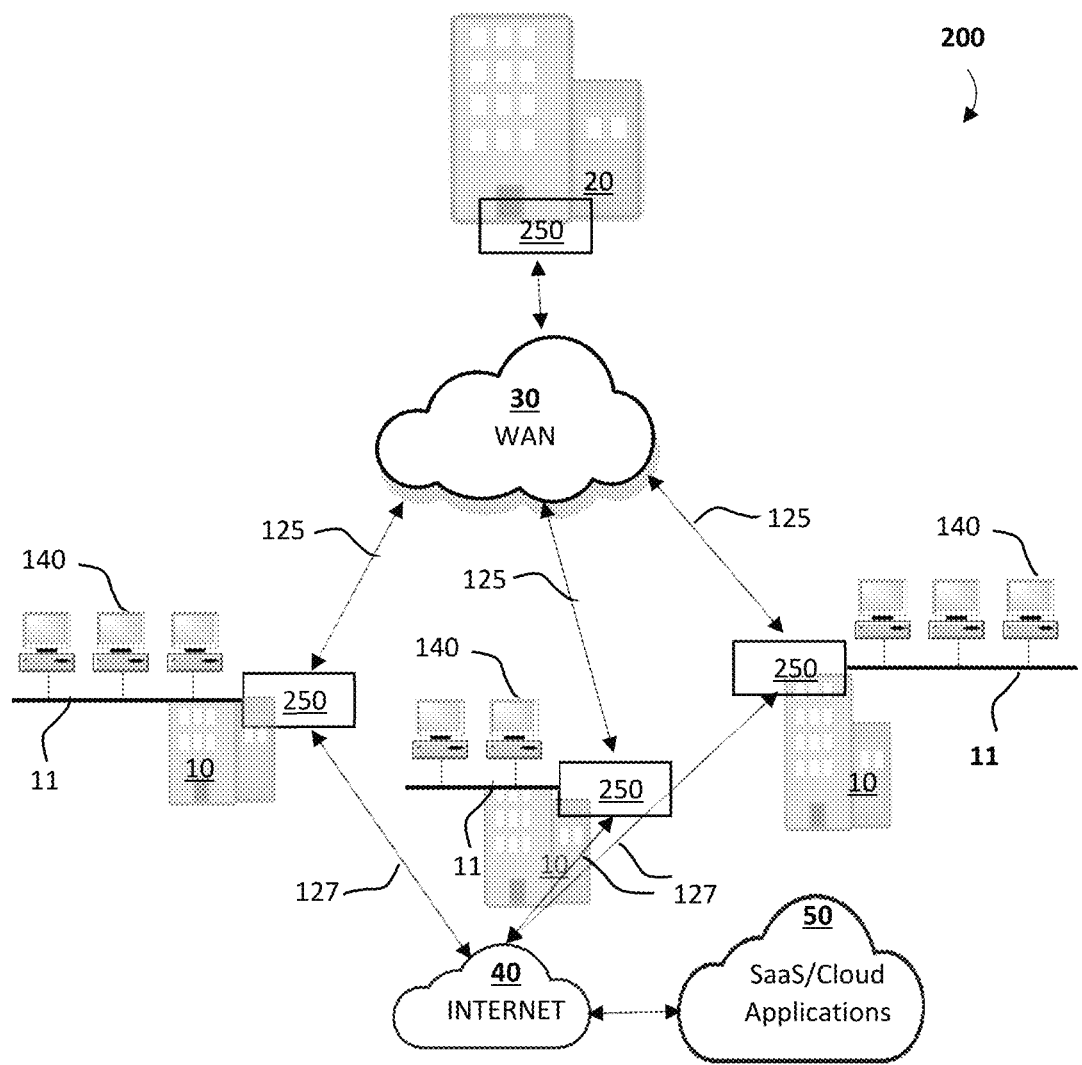
FIG. 2 illustrates an exemplary wide area network architecture having multiple network appliances directly connected to the Internet and WAN networking resources.

FIG. 2 illustrates a new architecture using an SD-WAN (Software Defined Wide Area Network) architecture 200 that can be used to provide access between remote offices 10, data centers 20, and SaaS applications 50. A number of branch offices 10 are tied to a data center 20 through a WAN network 30 using a network appliance 250. SaaS/Cloud applications 50 can be accessed through the Internet 40 using communication links 127 at each branch office 10. This architecture is advantageous in requiring fewer WAN links and less bandwidth. Each remote office 10 can directly utilize low cost and fast Internet 40 services to access the SaaS/Cloud applications 50.

However, there is a need for controlled access to the WAN based on the types of applications, corporate policies for separating segments of an office network, and security. This control can be referred to as the policies of the network or the policy configuration. Further, it is beneficial to have a central orchestrator to centrally and uniformly configure each of the network appliances 250 with policy configuration information and for each WAN packet to include this security information.

The WAN bandwidth can be divided up into segments where different parts of a corporate network are virtually kept separate from the other part. For example, there may be a segment for real-time data, voice or video, where there is a guaranteed quality of service. For SD-WANs (software defined wide area networks) these network segments are software defined and created centrally on the orchestrator and provisioned on the network appliances.

A policy configuration is a specification of rules to segments of network traffic. Different segments of network traffic can be viewed as having differing business intent. Thus, the different network segments can be managed based on the service quality needed, bandwidth, the application, and their security requirement. These business intents can be referred to as business intent overlays.

The policy configuration can be orchestrated by a computer or server in communication with all the network appliances 250 usually over what is referred to as the management plane of a network. Each network appliance 250 can have a unique identifier so they can apply these rules to their incoming and outgoing network traffic. The network appliances 250 are aware of the interfaces on which they received packets and are application aware. The policy configuration constrains network traffic based on specified rules and relationships. These rules and relationships are based on the network segments, the application sending and receiving data, and a security configuration. Each network appliance can receive the same policy configuration so that security configuration is uniformly implemented across the network.

Figure 3A:
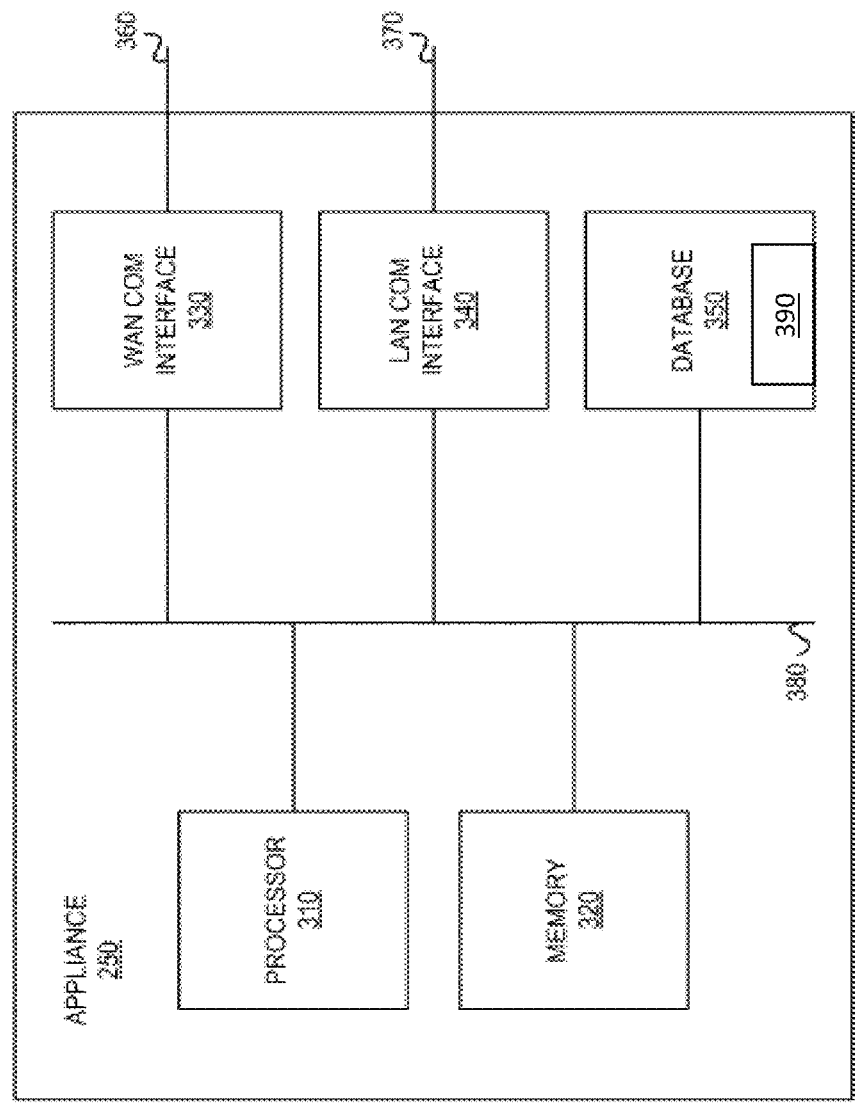
FIG. 3A is a block diagram of a network appliance.

FIG. 3A illustrates a block diagram of a network appliance 250 in an exemplary implementation of the invention. The appliance 250 includes a processor 310, memory 320, a WAN communication interface 330, a LAN communication interface 340, and a database and storage 350 device. A system bus 380 links the processor 310, the memory 320, the WAN communication interface 330, the LAN communication interface 340, and the database 350. When deployed in a branch location, line 360 links the WAN communication interface 330 to the WAN 127 (in FIG. 2), and line 370 links the LAN communication interface 11 to the computers 140 in FIG. 2.

The database and storage 350 comprise hardware and/or software elements configured to store data in an organized format to allow the processor 310 to create, modify, and retrieve the data. This includes software programs for processing incoming and outgoing data and storing the policy configuration. The database and storage 350 can include the policy configuration 390 (also shown in FIG. 3B). During operation of the network appliance 250, the policy configuration can be stored in memory 320. The hardware and/or software elements of the database 350 may include storage devices, such as RAM, hard drives, optical drives, flash memory, and magnetic tape.

In some embodiments, some network appliances 250 comprise identical hardware and/or software elements. Alternatively, in other embodiments, some network appliances 250, such as a second appliance, may include hardware and/or software elements providing additional processing, communication, and storage capacity. Further, routing functions related to enforcing the networking policy configuration can be performed within the network appliance 250.

Figure 3B:
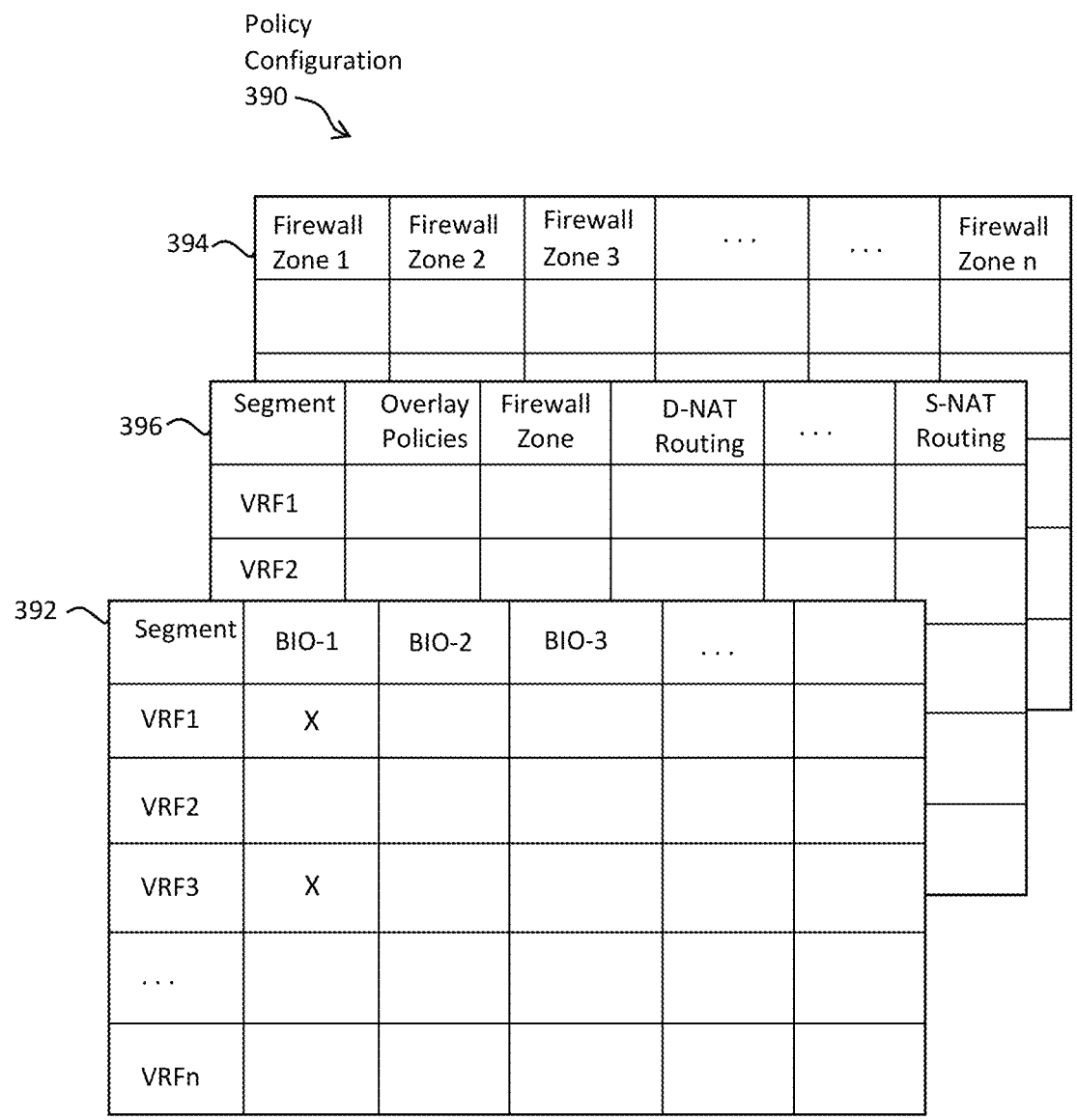
FIG. 3B is an exemplary table of the policy configuration.

FIG. 3B is one exemplary embodiment of a table representing the policy configuration 390 information. The policy configuration 390 is shown as a table but can be represented in other data structures including but not limited to database entries, linked lists, or flat files and is not limited to the representation shown in FIG. 3B. Further, network segment and security information shown are not to be considered exhaustive and can include any other information that relates to network segmentation, network tunneling, firewalls, and address translation. While the policy configuration 390 is shown as part of the database and storage 350 in FIG. 3A, it can be loaded into the computer memory 320 while the network appliance 250 is processing incoming and outgoing packets in accordance to the policy configuration 390.

The policy configuration 390 can be distributed to multiple network appliances 250 by a single server which can be referred to as the Orchestrator (not shown). In one embodiment, the setup of the policy configuration 390 is performed at a single location. The identical policy configuration 390 can be sent to all the network appliances 250. Also contemplated, is the modifying of the policy configuration 390 for each network appliance 250 or for the policy configuration 390 being truncated. Beneficially, the centralized management of the policy configuration 250 simplifies the configuration process, minimizes the possibility of errors, and provides a fast methodology of updating the security policies.

Table 392 defines the relationship between the network segments, referred to as segments or VRFs (Virtual Routing and Forwarding) and BIOs (Business Intent Overlays). A Business Intent Overlay (BIO) specifies how traffic with particular characteristics are handled within the network. Multiple BIOs can be created for different types of traffic. Which traffic matches a particular BIO is determined either by the label on the interface through which it enters the appliance, or by matching traffic to an access list. The BIOs control things like the WAN ports and network types for transmitting traffic, and what to do if the preferred links go down or fail to meet specified performance thresholds. Accordingly, this table 392 provides the policy or rules for generating and forwarding packets. For further information, Patent publications US 2016/0255542 A1 "Virtual Wide Area Network Overlays" provides more information on network overlays and is incorporated by reference.

Table 394 defines the relationship between the VRFs and other policies including but not limited to overlay polices for the Firewall zones applicable to a segment, network addresses that will be subject to D-NAT (Destination Network Address Translation) and S-NAT (Source Network Address Translation). The network appliance 250 can use the configuration of this table in the generation, validation, and processing of incoming and outgoing WAN packets.

Table 396 defines what network addresses and network protocols are allowed through and between firewall zones. FIGS. 6A-6D provide a description of exemplar user interfaces for entering the policy configuration 250 parameters.

Figure 4:
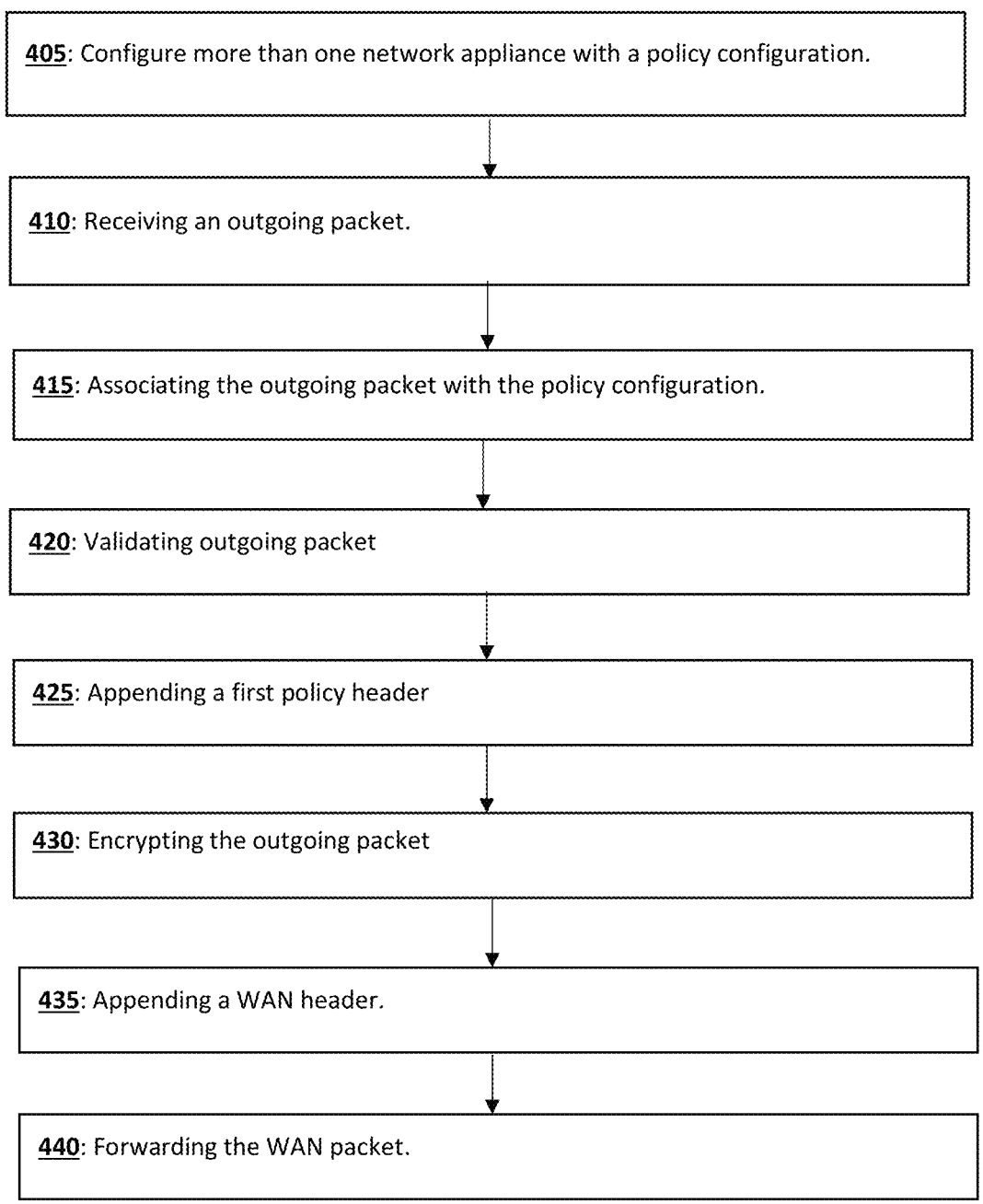
FIG. 4 is a flow chart of the process of generating an outgoing wide area network packet in accordance with a shared policy configuration.

FIG. 4 depicts an exemplary method for policy based networking by a network appliance, such as the appliance 250 of FIG. 2. Where the processing and generation of packet data in accordance with a policy configuration 390. Further, this method appends associated policy configuration 390 information, including but not limited to network segment, application data, and security associated information into the outgoing packets for validation in accordance with the policy configuration 390 by the receiving network appliance 250.

In step 405, one or more network appliances 250 are configured with a policy configuration. In one embodiment, all the network appliances 250 are configured with the same policy configuration. Accordingly, the configuration of a large network can be uniformly implemented without manual intervention and the possibility of manual entry errors. Each network appliance 250 will have to have an identifier to know its relation within the network in the policy configuration 390.

In a step 410, the network appliance 250 receives an outgoing packet that includes a destination address on a WAN network. The network appliance 250 can be configured with one or more WAN networks including but not limited the Internet, MPLS, or dedicated network lines. The outgoing packet can originate from sources including but not limited to a LAN network, VoIP system and a video system.

In a step 415, the outgoing packet is associated with the policy configuration 390 related to the network appliance 250 that received the packet. The association includes the classification of the packet by the port on which the packet was received and a determination of the application from which the packet originated. A person skilled in the art of network programing and design would know how to inspect and classify the packets. This information is matched up against the policy configuration 390 parameters for the port and application. The policy configuration can then be examined to determine which network segment the interface port and application is assigned.

In a step 420, the outgoing packet is validated against the policy configuration. The validation can include verifying that the outgoing packet destination is within the same network segment as the source. The outgoing packet can also be validated for security to verify that the destination address lies within the firewall zone specified in the policy configuration 390.

Further, if the destination of the outgoing packet is on a different network segment, then there can be a policy configuration check for packet tunneling between network segments.

Validation can include security policies. These can include granular application visibility match criteria methods. For example, wireless guest users (Guest Wifi) in one network segment can browse the Internet but not be allowed to go to social media sites or play online games while users in the other network segment can only access corporate SaaS applications but cannot browse the Internet, go to social media sites or play online games. In one embodiment, a user's browser session sees a timeout when a particular application is denied.

Other policy checks can be made including whether the outgoing packet is to be encrypted and which encryption protocol should be used.

Further, the policy configuration 390 can indicate that there is to be address translation of an outgoing packet. Different address translation protocols can be use including but not limited to S-NAT and D-NAT.

In a step 425, a policy header is added to the outgoing packet. The policy header can contain but is not limited to network segment information, firewall zone information, tunneling information for networking between network segments, and address translation information. The outgoing packet, appended with the appended policy header forms a packet payload.

In an optional step 430, the outgoing packet payload can be encrypted. The encryption and protocols can include but are not limited to UDP-IPsec (RFC 3948), IKE-IPsec (Internet Key Exchange), and GRE-IPsec (Generic Routing Encapsulation). This step can include adding IPsec headers according to the protocol use.

In a step 435, a WAN header is added to the outgoing payload thereby forming a WAN packet. The format of the WAN header is selected to be compatible with the WAN interface indicated by the network segment identified by the policy configuration.

In a step 440, the WAN packet is forwarded to the WAN interface for transmission over the selected network.

Figure 5:
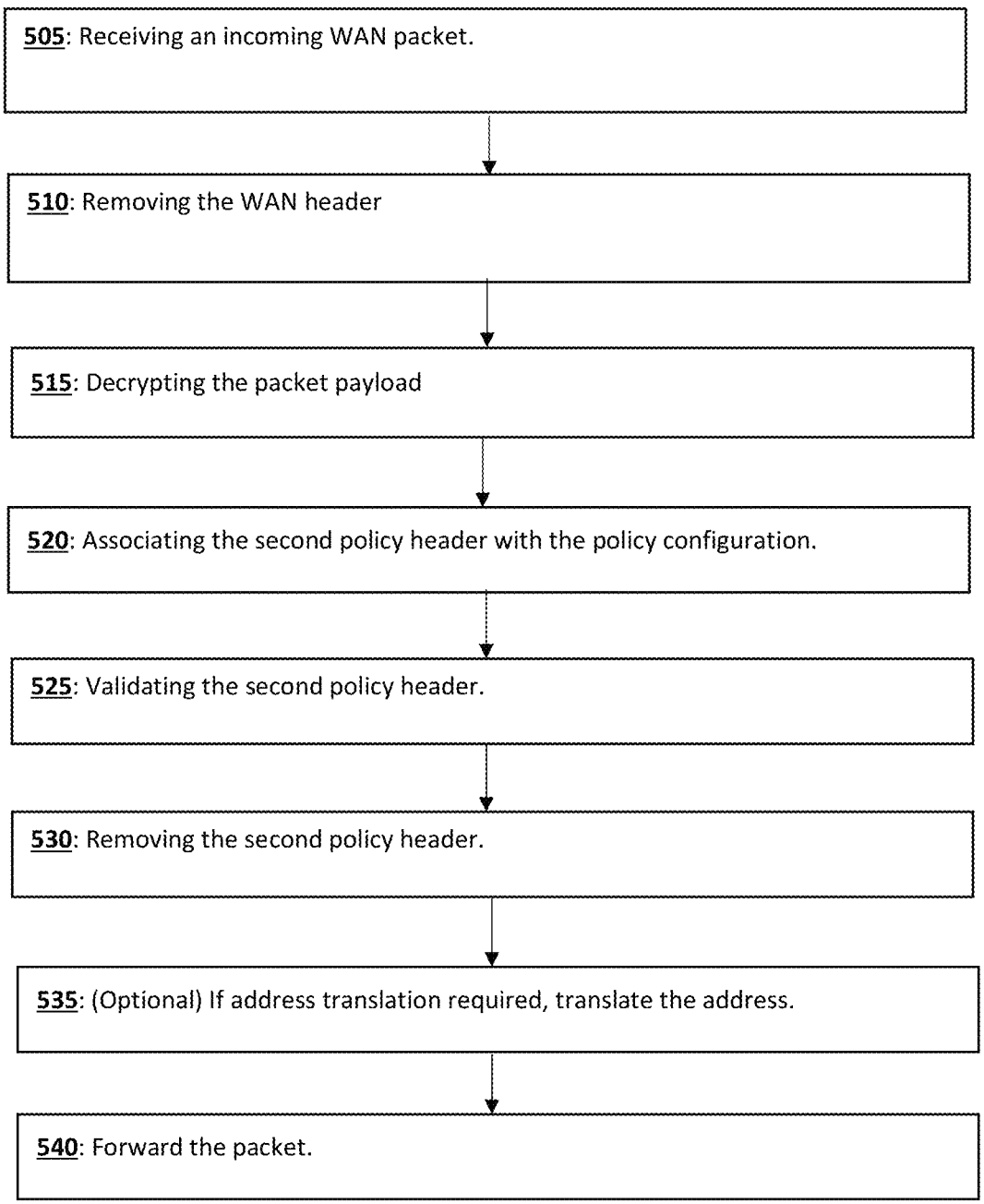
FIG. 5 is a flow chart of the process of processing an incoming a wide area network packet in accordance with a shared policy configuration.

The method 400 can further comprise a method 500 for receiving and processing an incoming WAN packet, decrypting it, validating the WAN packet, and provide network address translation if required. FIG. 5 depicts an exemplary method for a network appliance, such as the appliance 250 of FIGS. 2 and 3A, to process the incoming packet data in accordance to a policy configuration 390.

In a step 505, an incoming WAN packet is received from one of the wide area network interfaces on a network appliance. This can include WAN packets from the Internet, MPLS services, or other leased networking line.

In a step 510, the WAN header is removed from the WAN packet. This results in an incoming packet payload remaining. This packet payload includes a second policy header.

In an optional step 515, if the encrypted packet payload is decrypted and any security protocol headers removed. The encryption protocol can include but is not limited to UDP-IPsec, IKE-IPsec, or GRE-IPsec.

In a step 520, the second policy header is associated with the policy configuration 390 related to the network appliance 250 that received the incoming packet. The association includes the classification of the incoming packet by the port on which the packet was received and determining the application from which the packet originated. A person skilled in the art of network programing and design would know which fields to examine to classify the incoming packet. This information is matched against the policy configuration 390 parameters for the port and application.

In a step 525, the second policy header is validated. The network appliance knows which network segment that the incoming packet was received. The incoming packet routing can be verified against the second policy header based on the label of the network interface, or a more complex policy using a variety of packet inspection techniques. For example, the incoming traffic may already be mixed and the appliance would need to separate it out into traffic classifications (for example, voice, video, and data) using a combination of traffic statistics and packet content. Further, the validation can include verifying that the policy configuration permits the incoming packet to be forwarded to the destination address. There can also be a security validation where the firewall zones of the port and destination network addresses are verified. If the packet does not meet the policy configuration for the networking segments, the applications allowed, and security, then the packet can be dropped.

In a step 530, the second policy header is removed from incoming WAN packet. The second policy header was added to conform and validate that the incoming packet met the policy configuration. It must be removed before forwarding the packet on to other destination to be compatible with destination network, typically a LAN.

In an optional step 535, if indicated by the second policy header, the destination address is translated. Multiple branch offices may be using the same IP address and thus would, if used, cause a conflict. Translating the IP address can be done using standard NAT protocols including but not limited to D-NAT and S-NAT.

In a step 540, the incoming packet is forwarded to the interface on which the packet destination address is located. This step can include appending the network protocol header associated with the incoming packet destination address. This step can include appending the network protocol header associated with the destination address within the incoming packet.

Figures 6A, 6B, 6C:
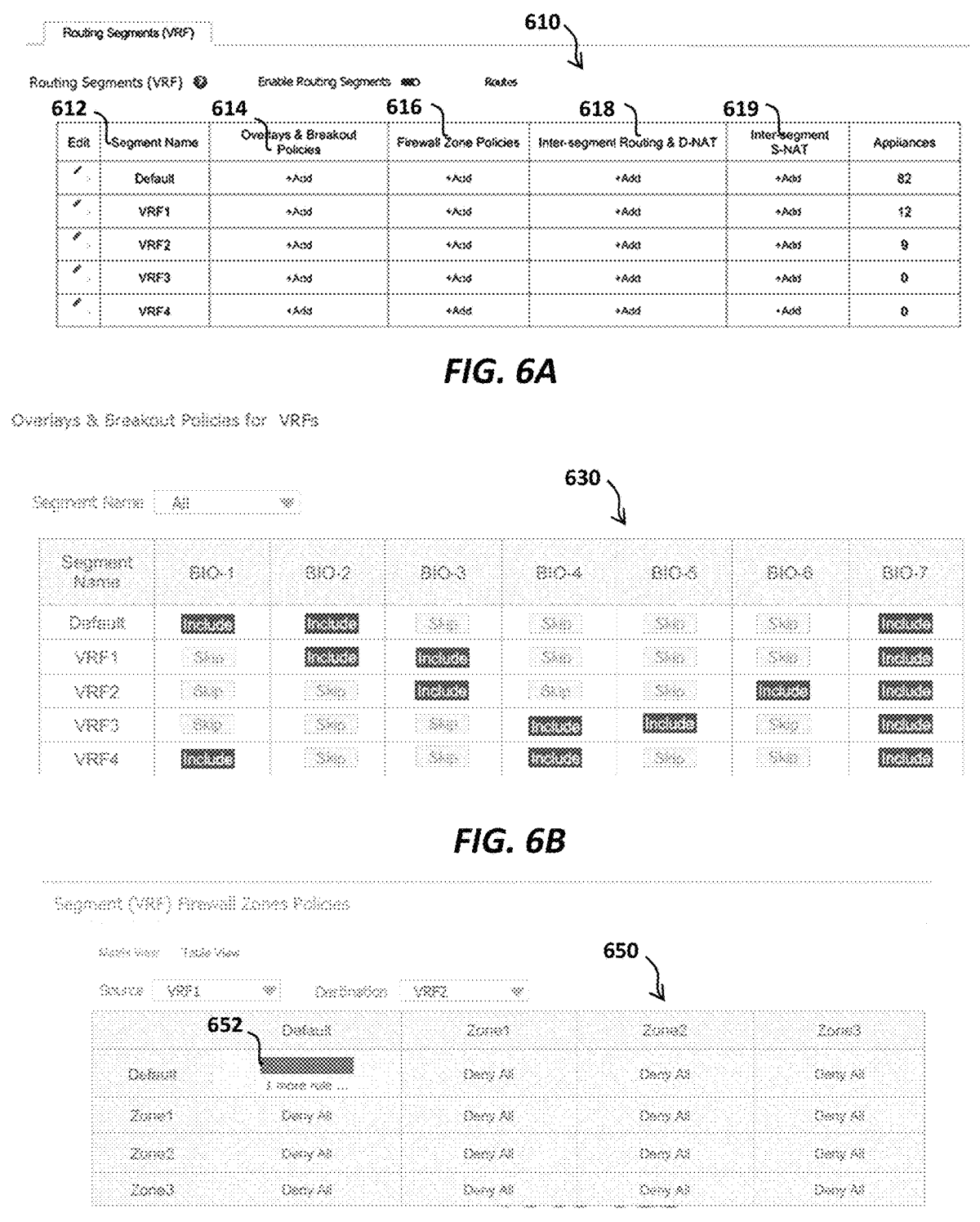

FIG. 6A illustrates one embodiment of a routing segment user interface 610 for configuring network segments (routing segments) of the policy configuration 390. This interface page enables creating and labeling of network segment names 612. Overlays and breakout polices can be specified for each segment. Overlays are logical tunnels created for different traffic types and policies (such as VoIP). Breakouts specify the policy configuration for Internet SaaS applications or for guest WiFi traffic.

The routing segment user interface 610 also provides a field for specifying the firewall zone policies 616. A firewall zone is a collection of interfaces and the network segments attached to the interfaces. It can have physical interfaces, logical interfaces, sub-interfaces, and VLAN-tagged interfaces. An interface belongs to a single zone, but a zone can have multiple interfaces. Zone-based firewalls, in an embodiment of the SD-WAN extend the concept of zones to WANs and include overlays that are separate from LAN segments. This zone information can be stored in the policy configuration 390 and included with the generation, validation, and processing of SD-WAN packets.

The routing segments user interface 610 includes a field for specifying the policy configuration for Inter-segment Routing and D-NAT 618. Some network traffic may need to be transmitted across network segments or VRFs and these exceptions can be configured in this field. Transmitting packets from one network segment to another network segment is normally blocked by virtue of network segmentation. Exceptions to cross segment traffic can be specified in this field 618. Another issue that can occur is conflicting network addresses. Two computers on different network segments might have the same destination address. The Inter-segment Routing and D-NAT field 618 provides for the destination address translation packets. Again, this Inter-Segment Routing and D-NAT can be part of the policy configuration 390.

FIG. 6B illustrates one embodiment of a user interface 630 for configuring an association between the VFRs and the BIOs. For a given BIO, the inclusion of which VRFs that are part of a BIO is specified. Again, these user configurations are stored as part of the policy configuration and used in the generation, validation and processing of the packets.

FIG. 6C illustrates one embodiment of a user interface 650 for configuring firewall zone policy. A firewall zone is a collection of interfaces and the network segments attached to the interfaces. Rules 652 can be specified for what IP addresses can receive data and what IP addresses can be allowed to transmit between the zones.

Figure 6D:
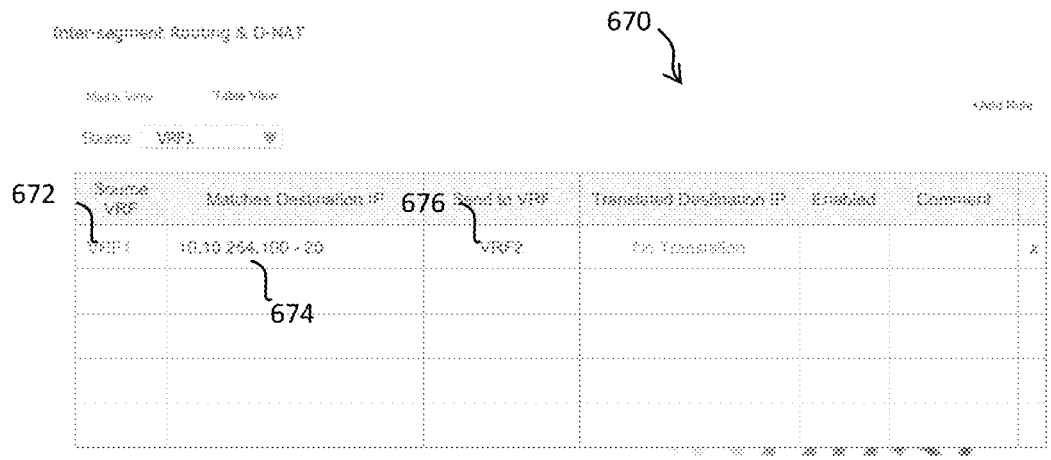
FIG. 6D is an exemplar user interface for configuring Inter-segment Routing.

FIG. 6D illustrates one embodiment of a user interface 670 for configuring the network address that can have tunnels between different network segments, and address translation between network segments or VRFs. For each VRF 672, 676 having address translation, the IP address to be translated 674 can be specified.

Figure 7A:
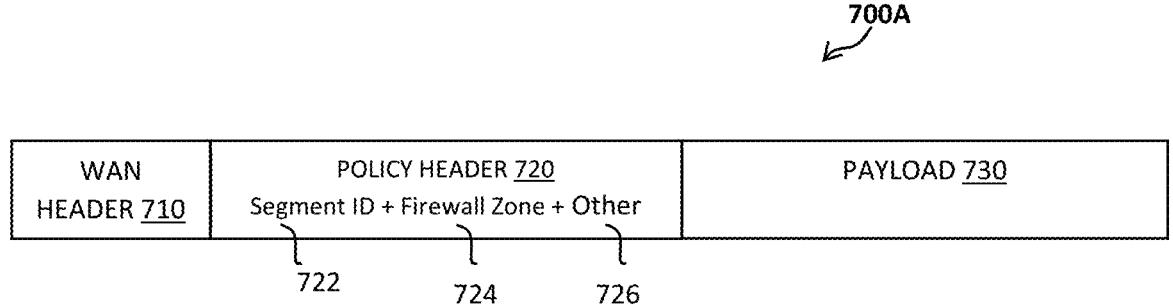
FIG. 7A is an exemplar wide area packet including a policy header.
Figure 7B:
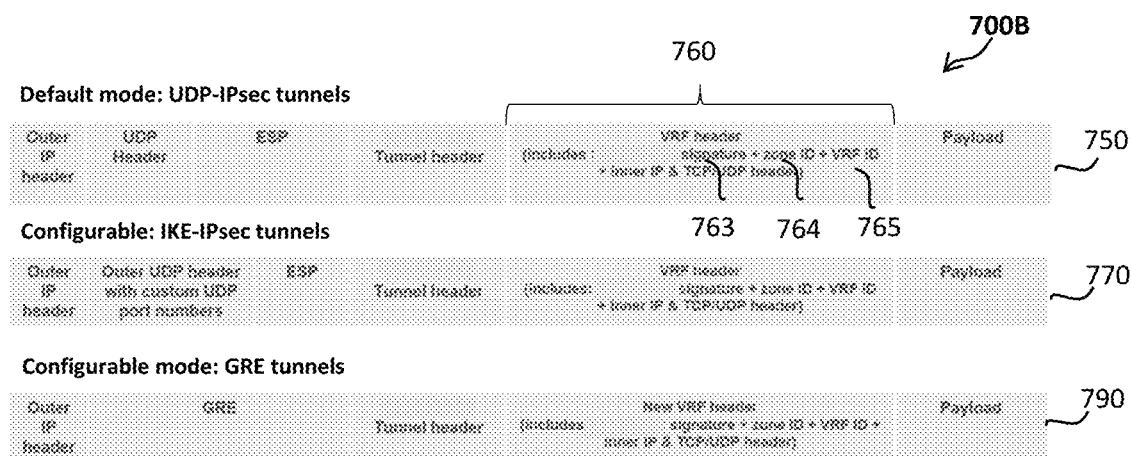
FIG. 7B is exemplar encrypted wide area packets including a policy header.

FIGS. 7A and 7B shows two embodiments of a WAN packet 700A, 700B with a policy header embedded in the packet. The packets are generated and processed by the network appliance 250. Data from a local area network 11 can be received by the network appliance 250 and if the destination address is outside the local network, used to generate a WAN packet.

FIG. 7A illustrates a simplified unencrypted WAN packet. The packet can include a WAN header 710, policy header 720, and a payload 730. The payload 730 is the data received from the LAN. It can include the packet headers from the LAN (not shown). Further, the payload 730 could be modified if network address translation was applied to the packet.

The WAN header 710 is the header required to communicate over the WAN links 125 in FIG. 2 over which the network appliances communicate. These WAN can be dictated by a service provider or by the equipment used to connect over leased lines between a central office and a data center.

The policy header 720 can include, but is not limited to, a network segment, information regarding the application generating or sending the packet, a firewall zone 724, and other information 726. The segment id 722 identifies which segment or VRF within a SD-WAN the WAN packet should be sent or is from. A person skilled in the area of network configuration would know how to configure the system for the network appliance 250 to select a segment that complied with a desired policy configuration. The firewall zone 724 limits communication to other network addresses within firewall zones specified within the policy configuration 390. The other information 726 can include information regarding security protocols being used or equipment identifiers. An equipment identifier can include an identifier of the equipment manufacture or the individual network appliance 250 generating the WAN packet.

When a WAN packet 700A is generated, the policy header is generated to be in conformance with the policy configuration 390. When an embodiment WAN packet 700A is validated the policy header is used to validate that the packet is in conformance with the policy configuration 390.

FIG. 7B shows an alternative embodiment of WAN packets utilizing encryption. The three encrypted packet formats 750, 770, and 790 are encrypted in accordance with three different encryption protocol, UDP-IPsec, IKE-IPsec, and GRE. Added to the security packet payload is the policy header 760. This header is added to every packet sent over the SD-WAN and found on every packet received on the SD-WAN. The policy header 760 can contain, but is not limited to an identifier 763, and zone identifier 764, and a routing segment identifier 765.

What is claimed is:

1. A method for policy based networking comprising the steps:
   configuring a plurality of network appliances with a policy configuration, wherein each network appliance is coupled to at least one wide area network;
   receiving an outgoing packet having a destination address behind one of the plurality of network appliances coupled to at least one network;
   associating the outgoing packet with the policy configuration, by:
      classifying the outgoing packet by a port on which the outgoing packet was received;
      determining an application from which the outgoing packet originated; and
      determining, based on the policy configuration, a network segment to which the port and the application are assigned;
   validating the outgoing packet against the policy configuration by verifying that the destination address of the outgoing packet is in a same network segment as the determined network segment, thereby setting a forwarding indication if the outgoing packet should be forwarded;
   appending a first policy header to the outgoing packet and thereby forming an outgoing payload;
   appending to the outgoing payload a WAN header compatible with the destination address associated with the one of the plurality of network appliances coupled to at least one network, thereby forming an outgoing WAN packet; and
   forwarding the outgoing WAN packet to the destination address associated with the one of the plurality of network appliances coupled to at least one network if the forwarding indication is set.

2. The method of claim 1 further comprising the steps:
   receiving, from one of the at least one wide area networks, an incoming WAN packet having a WAN header and an incoming payload, wherein the incoming payload includes a second policy header and an incoming packet;
   removing the WAN header from the incoming WAN packet thereby forming the incoming payload;
   associating the second policy header with the policy configuration;
   validating the second policy header against the policy configuration thereby setting a valid indication if the incoming packet should be forwarded;
   removing the second policy header from the incoming payload thereby forming the incoming packet; and
   forwarding the incoming packet if the valid indication is set.

3. The method of claim 2, wherein the outgoing packet and the incoming packet have a destination network address and a source network address, and wherein the policy configuration includes at least one of a network segment, application rules, and a security protocol associated with the source network address and the destination network address.

4. The method of claim 3, wherein the security protocol includes one or more firewall zones within the network segment.

5. The method of claim 3, wherein the network segment is associated with a segment in a software-defined wide area network.

6. The method of claim 2, further comprising the step of encrypting the outgoing payload and decrypting the incoming payload.

7. The method of claim 2, wherein the policy configuration includes network address translation of the outgoing packet and the incoming packet.

8. A network appliance comprising:
   at least one wide area network interface, wherein the at least one wide area network is configured to receive an outgoing packet and transmit an incoming packet;
   memory, wherein the memory is configured with a policy configuration;
   a processor, wherein the processor is configured to associate the policy configuration with the outgoing packet, to validate the outgoing packet against the policy configuration, to set a forwarding indication if the outgoing packet is validated, to append a first policy header to the outgoing packet and thereby form an outgoing payload, to append to the outgoing payload a WAN header compatible with at least one wide area network interface and thereby form an outgoing WAN packet, and to forward the outgoing WAN packet to at least one wide area network interface if the forwarding indication is set,
   wherein the processor is further configured to associate the policy configuration with the outgoing packet by:
      classifying the outgoing packet by a port on which the outgoing packet was received;
      determining an application from which the outgoing packet originated; and
      determining, based on the policy configuration, a network segment to which the port and the application are assigned; and
   wherein the processor is further configured to validate the outgoing packet against the policy configuration by verifying that the destination address of the outgoing packet is in a same network segment as the determined network segment.

9. The network appliance of claim 8, wherein the at least one wide area network interface is configured to receive, from one of the at least one wide area networks, an incoming WAN packet having a WAN header and an incoming payload, wherein the incoming payload includes a second policy header and an incoming packet, to remove the WAN header from the WAN packet thereby forming the incoming payload that includes the second policy header, to associate the second policy header with the policy configuration, to validate the second policy header against the policy configuration thereby setting a valid indication if the incoming packet should be forwarded, to remove the second policy header from the incoming payload thereby forming the incoming packet, and to forward the incoming packet if the valid indication is set.

10. The network appliance of claim 8, wherein the outgoing packet and the received packet have a destination network address and a source network address, and wherein the policy configuration includes a network segment, application rules, and a security protocol based on the source network address and the destination network address.

11. The network appliance of claim 10, wherein the security protocol includes one or more firewall zones within the network segment.

12. The network appliance of claim 10, wherein the network segment is associated with a segment in a software-defined wide area network.

13. The network appliance of claim 9, wherein the network appliance is further configured to encrypt the outgoing payload and decrypt the incoming payload.

14. A network system comprising:
a plurality of network appliances each network appliance comprising,
a wide area network interface,
a local area network interface,
a processor, and
memory; and
a software-defined wide area network (SD-WAN),
wherein the SD-WAN is coupled to each network appliance's wide area network interface,
wherein each network appliance is configured with a policy configuration,
wherein a wide area network interface of a respective network appliance is configured to receive an outgoing packet from the local area network interface and transmit the outgoing packet on the wide area network interface and to receive an incoming packet on the wide area network interface and send the incoming packet on the local area network interface, wherein the respective network appliance is configured to associate the policy configuration with the outgoing packet, wherein the respective network appliance is configured to append a first policy header to the outgoing packet and thereby form an outgoing payload, to append to the outgoing payload a WAN header compatible with the respective network appliance's wide area network interface and thereby form an outgoing WAN packet, and to forward the outgoing WAN packet to the network appliance's wide area network interface if the forwarding indication is set,
wherein the respective network appliance is further configured to associate the policy configuration with the outgoing packet by:
classifying the outgoing packet by a port on which the outgoing packet was received;
determining an application from which the outgoing packet originated; and
determining, based on the policy configuration, a network segment to which the port and the application are assigned; and
wherein the respective network appliance is further configured to validate the outgoing packet against the policy configuration by verifying that a destination of the outgoing packet is in a same network segment as the determined network segment.

15. The network system of claim 14, wherein the policy configuration includes a network segment, application rules, and a security protocol.

16. The network system of claim 15, wherein the security protocol includes one or more firewall zones within the network segment.

* * * * *